US010335937B2

(12) United States Patent
Moore et al.

(10) Patent No.: US 10,335,937 B2
(45) Date of Patent: *Jul. 2, 2019

(54) FASTENER-DRIVING TOOL INCLUDING A FASTENING RESULT DETECTOR

(71) Applicant: Illinois Tool Works Inc., Glenview, IL (US)

(72) Inventors: Stephen P. Moore, Palatine, IL (US); Daniel J. Birk, McHenry, IL (US)

(73) Assignee: Illinois Tool Works Inc., Glenview, IL (US)

( * ) Notice: Subject to any disclaimer, the term of this patent is extended or adjusted under 35 U.S.C. 154(b) by 397 days.

This patent is subject to a terminal disclaimer.

(21) Appl. No.: 15/197,263

(22) Filed: Jun. 29, 2016

(65) Prior Publication Data

US 2016/0303722 A1    Oct. 20, 2016

Related U.S. Application Data

(63) Continuation of application No. 13/796,290, filed on Mar. 12, 2013, now Pat. No. 9,381,635.

(60) Provisional application No. 61/655,681, filed on Jun. 5, 2012.

(51) Int. Cl.
| | | |
|---|---|---|
| B25C 1/04 | (2006.01) | |
| B25C 1/08 | (2006.01) | |
| B25C 1/00 | (2006.01) | |
| G01D 5/20 | (2006.01) | |

(52) U.S. Cl.
CPC ............. B25C 1/04 (2013.01); B25C 1/00 (2013.01); B25C 1/047 (2013.01); B25C 1/08 (2013.01); G01D 5/20 (2013.01)

(58) Field of Classification Search
CPC ... B25C 7/00; B25C 1/08; F15B 15/14; F15B 9/09
USPC .............. 173/46, 20, 217; 227/8; 123/46 SC
See application file for complete search history.

(56) References Cited

U.S. PATENT DOCUMENTS

| | | |
|---|---|---|
| 4,023,044 A | 5/1977 | Miller et al. |
| 4,207,567 A | 6/1980 | Juengel et al. |
| 4,339,749 A | 7/1982 | Yamada |
| 4,403,722 A | 9/1983 | Nikolich |
| 4,483,473 A | 11/1984 | Wagdy |
| 4,483,474 A | 11/1984 | Nikolich |
| 4,487,353 A | 12/1984 | Benson et al. |
| 4,492,329 A | 1/1985 | Benson et al. |
| 4,514,724 A | 4/1985 | Valentine |

(Continued)

OTHER PUBLICATIONS

International Search Report and Written Opinion for International Application No. PCT/US2013/043928, dated Jan. 27, 2014 (9 pages).

(Continued)

Primary Examiner — Nathaniel C Chukwurah
(74) Attorney, Agent, or Firm — Neal, Gerber & Eisenberg LLP

(57) ABSTRACT

A fastener driving tool including a housing, a cylinder enclosed by the housing, at least one sensor associated with the cylinder and a piston configured to reciprocate within the cylinder and having a driver blade depending therefrom. The tool includes at least one signal generator associated with the piston, where movement of the piston relative to the at least one sensor generates a signal. A controller is configured to receive the signal and indicate a fastening result based on the signal.

20 Claims, 6 Drawing Sheets

(56) References Cited

U.S. PATENT DOCUMENTS

| | | |
|---|---|---|
| 4,514,797 A | 4/1985 | Begin |
| 4,522,162 A | 6/1985 | Nikolich |
| 4,610,381 A | 9/1986 | Kramer et al. |
| RE32,452 E | 7/1987 | Nikolich |
| 4,811,883 A | 3/1989 | Thurner et al. |
| 4,918,616 A | 4/1990 | Yoshimura et al. |
| 4,942,387 A | 7/1990 | Thomas |
| 4,980,844 A | 12/1990 | Demjanenko et al. |
| 4,992,741 A | 2/1991 | Douglas et al. |
| 5,197,646 A | 3/1993 | Nikolich |
| 5,231,352 A | 7/1993 | Huber |
| 5,233,293 A | 8/1993 | Huang et al. |
| 5,251,151 A | 10/1993 | Demjanenko et al. |
| 5,263,439 A | 11/1993 | Doherty et al. |
| 5,298,889 A | 3/1994 | Diei et al. |
| 5,319,357 A | 6/1994 | Diei et al. |
| 5,480,088 A | 1/1996 | Braun |
| 5,517,183 A | 5/1996 | Bozeman, Jr. |
| 5,594,414 A | 1/1997 | Namngani |
| 5,732,870 A | 3/1998 | Moorman |
| 5,914,882 A | 6/1999 | Yeghiazarians |
| 6,145,724 A | 11/2000 | Shkolnikov et al. |
| 6,209,400 B1 | 4/2001 | Schoch et al. |
| 6,297,742 B1 | 10/2001 | Canada et al. |
| 6,520,397 B1 | 2/2003 | Moeller |
| 6,607,041 B2 | 8/2003 | Suzuki et al. |
| 6,619,527 B1 | 9/2003 | Moeller |
| 6,834,559 B1 | 12/2004 | Beebe |
| 7,182,148 B1 | 2/2007 | Szieff |
| 7,193,405 B2 | 3/2007 | Murray |
| 7,202,658 B2 | 4/2007 | Ketelaars et al. |
| 7,231,303 B2 | 6/2007 | Griessler et al. |
| D605,919 S | 12/2009 | Schneider et al. |
| 7,734,859 B2 | 6/2010 | Daniel et al. |
| 7,834,618 B2 | 11/2010 | Moura et al. |
| 7,934,566 B2 | 5/2011 | Hlinka et al. |
| 8,049,637 B2 | 11/2011 | Tompkins et al. |
| 9,381,635 B2 * | 7/2016 | Moore ..................... B25C 1/00 |
| 2001/0007420 A1 | 7/2001 | Bijawat et al. |
| 2002/0123386 A1 | 9/2002 | Perlmutter |
| 2003/0024311 A1 | 2/2003 | Perkins |
| 2005/0001000 A1 * | 1/2005 | Favre-Bulle ............. B25C 1/08 |
| | | 227/2 |
| 2005/0072239 A1 | 4/2005 | Longsdorf et al. |
| 2006/0065690 A1 | 3/2006 | Fujisawa et al. |
| 2007/0008162 A1 | 1/2007 | Gossett et al. |
| 2007/0221697 A1 | 9/2007 | Gschwend |
| 2008/0078799 A1 | 4/2008 | Wen |
| 2008/0110653 A1 | 5/2008 | Zhang et al. |
| 2008/0236585 A1 | 10/2008 | Parker et al. |
| 2008/0252446 A1 | 10/2008 | Dammertz |
| 2008/0288200 A1 | 11/2008 | Noble |
| 2008/0319570 A1 | 12/2008 | Van Schoiack |
| 2009/0000801 A1 | 1/2009 | Calvet et al. |
| 2009/0248326 A1 | 10/2009 | Greening |
| 2010/0038394 A1 | 2/2010 | Hlinka et al. |
| 2010/0058901 A1 | 3/2010 | Calloway et al. |
| 2010/0243699 A1 | 9/2010 | Largo |
| 2011/0105955 A1 | 5/2011 | Yudovsky et al. |
| 2011/0162858 A1 | 7/2011 | Coste |
| 2011/0186319 A1 | 8/2011 | Pellenc |
| 2012/0083705 A1 | 4/2012 | Yuen et al. |
| 2012/0146463 A1 | 6/2012 | Ng et al. |
| 2012/0298390 A1 | 11/2012 | Schieler et al. |
| 2013/0127262 A1 | 5/2013 | Roser |
| 2014/0288874 A1 | 9/2014 | Mattsunaga et al. |

OTHER PUBLICATIONS

International Preliminary Report on Patentability for International Application No. PCT/US2013/043928, dated Dec. 9, 2014 (6 pages).

* cited by examiner

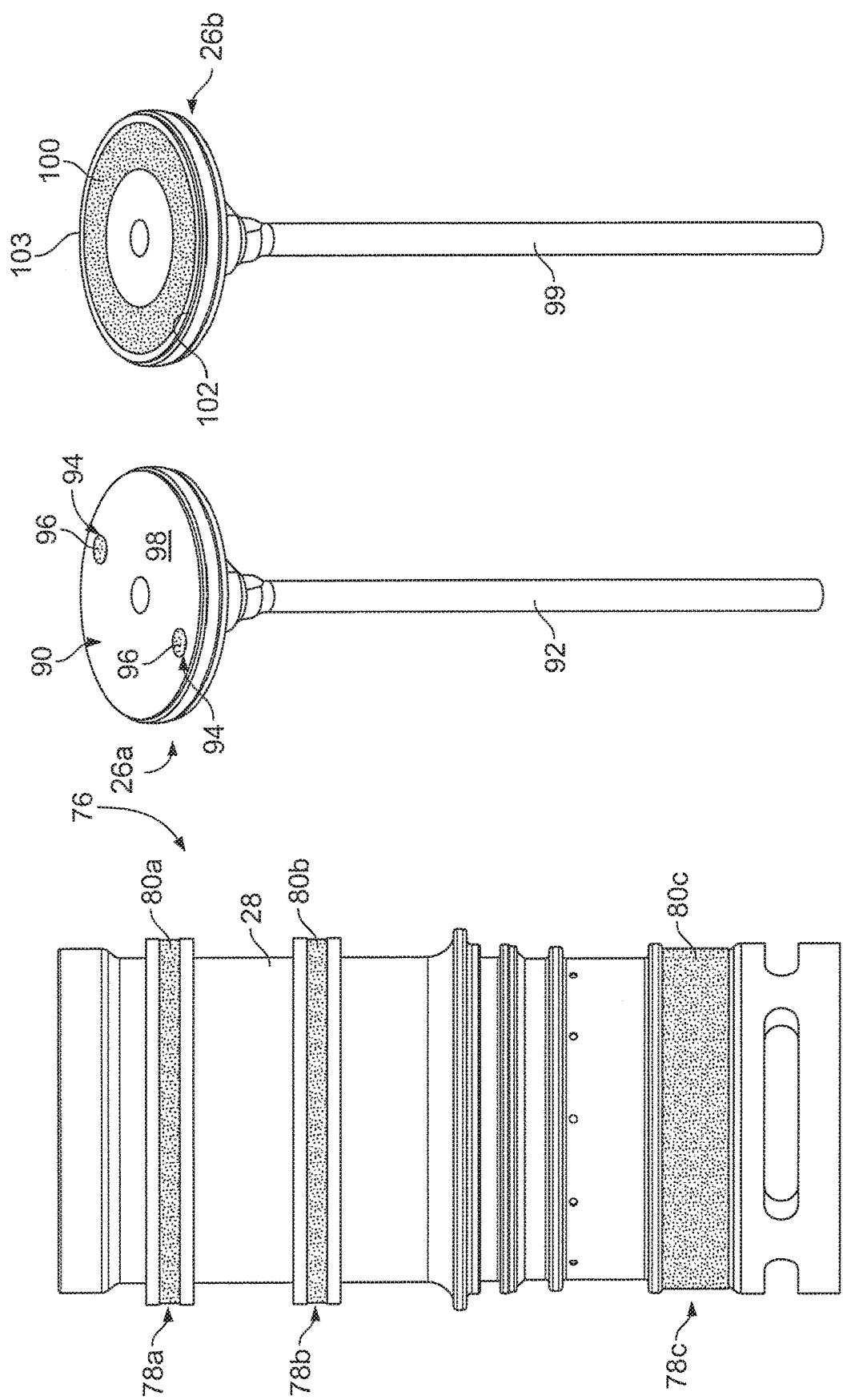

FASTENER-DRIVING TOOL INCLUDING A FASTENING RESULT DETECTOR

PRIORITY CLAIM

This application is a continuation of, and claims priority to and the benefit of, U.S. patent application Ser. No. 13/796,290, which was filed on Mar. 12, 2013 and which issued as U.S. Pat. No. 9,381,635 on Jul. 5, 2016, which claims priority to and the benefit of U.S. Provisional Patent Application No. 61/655,681, which was filed on Jun. 5, 2012, the entire contents of each of which are incorporated herein by reference.

BACKGROUND

The present invention relates generally to fastener driving tools, and particularly to such tools being powered electrically, by compressed gas, combustion or powder.

Powered fastener-driving tools, and particularly those using compressed air as an energy source, incorporate a housing enclosing a cylinder. Slidably mounted within the cylinder is a piston assembly in communication on one side with a supply chamber and a return chamber on the opposite side thereof. The piston assembly includes a piston head and a rigid driver blade that is disposed within the cylinder. A movable valve plunger is oriented above the piston head. In its at-rest position this valve plunger prevents the drive chamber from communicating to the piston assembly and allows an air flow path to atmosphere above the piston assembly. In its actuated state, the valve plunger prevents or blocks the air flow path to atmosphere and allows an air flow path to the drive chamber.

When a tool's actuation requirements have been met, the movable valve plunger opens and exposes one side of the piston assembly to a compressed gas energy source. The resulting pressure differential causes the piston and driver blade to be actuated downward to impact a positioned fastener and drive it into a workpiece. Fasteners are fed into the nosepiece from a supply assembly, such as a magazine, where they are held in a properly positioned orientation for receiving the impact of the driver blade.

As the piston is actuated downward, it drives the air inside the cylinder through a series of vents into the return chamber increasing the pressure in this chamber. After the fastening result has taken place, the valve plunger moves back to the at-rest position, blocking the supply chamber's air flow path to the piston head and releasing the pressure above the piston head through the path to atmosphere. At this time, the pressure built in the return chamber pushes the piston assembly back up towards the top of the cylinder. The air above the piston head is forced through the valve plunger's air flow path to atmosphere.

Other fastener driving tools operate similarly in that a reciprocating driver blade drives fasteners fed to a nosepiece by a biased magazine. The power source varies, with combustion, electric and powder operated tools being well known in the art.

Pneumatic nailers and other types of powered fastener driving tools are used in construction framing, where building panels such as plywood, wallboard, roof sheathing or other construction panels are secured to framing studs with fasteners, typically nails. A fastener that is driven into a framing stud is called a "hit" or a successful fastening result. A common problem for installers is making sure that each fastening result is a "hit" to effectively secure the panel in place. Fasteners not engaging the stud represent an unsuccessful fastening result or "miss," which is a wasted effort as well as wasted materials.

Many installers employ separate stud finders to facilitate location of the studs, which entails additional effort and inconvenience in carrying and maintaining an extra battery-powered device. Also, the installer cannot see the stud finder's readout while working, and the use of these devices slows production, so professional installers do not typically use separate stud finders. Alternatively, other installers measure the spacing of the studs from a corner or panel edge, often using a chalk line, since studs are conventionally built on 16 inch centers or some other standard depending on the geographic location.

Also, conventional fastener-driving tools are available with built in stud finders. Such devices locate the stud, but do not indicate whether the fastener was properly driven into both the panel and the supporting stud, or improperly, only into the panel. As such, the available techniques for accurately driving fasteners are not consistently accurate, and the problem of misdirected fasteners persists in the context of framing construction.

SUMMARY

The above-listed needs are met or exceeded by the present fastening result indicator for a fastener-driving tool.

In one embodiment, a fastener driving tool is provided and includes a housing, a cylinder enclosed by the housing, at least one sensor associated with the cylinder and a piston configured to reciprocate within the cylinder and having a driver blade depending therefrom. The tool includes at least one signal generator associated with at least one of the cylinder and the piston, where movement of the piston relative to the at least one sensor generates a signal. A controller is configured to receive the signal and indicate a fastening result based on the signal.

In another embodiment, a fastener driving tool is provided and includes a housing, a cylinder enclosed by the housing, a plurality of sensors associated with the cylinder and a piston configured to reciprocate within the cylinder and having a driver blade depending therefrom. Movement of the piston relative to each of the plurality of sensors generates a signal at each of the sensors. A controller is configured to communicate with each of the plurality of sensors and receive each of the signals, where the controller determines a fastening result based on at least two of the signals.

In a further embodiment, a selector is movably connected to the tool and in communication with the controller described in either of the above embodiments. The selector is movable between a first position associated with a set of fastening result parameters, and a second position associated with a second set of fastening result parameters, where the controller's programmed expectations for a "hit" result and a "miss" result are determined by the position of the selector and the controller determines a fastening result based on the signals produced by at least one sensor.

BRIEF DESCRIPTION OF THE DRAWINGS

FIG. 4 is an elevation view of the piston assembly of FIG. 3;

FIG. 5 is a perspective view of an embodiment of a piston in the piston assembly of FIG. 3;

FIG. 6 is a perspective view of another embodiment of the piston in the piston assembly of FIG. 3;

DETAILED DESCRIPTION

Figure 1:
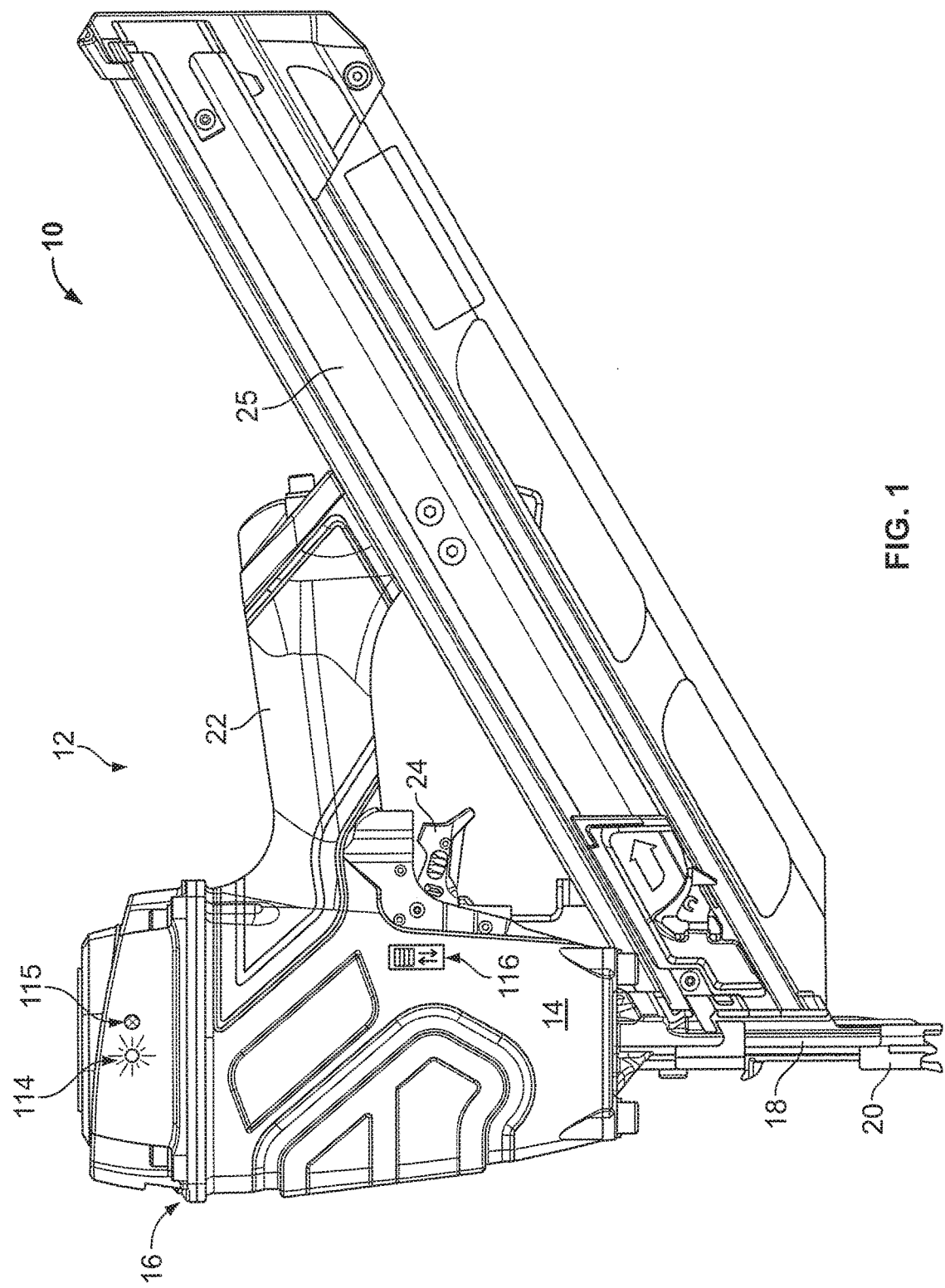
FIG. 1 is a perspective view of a pneumatic fastening tool.
Figure 2:
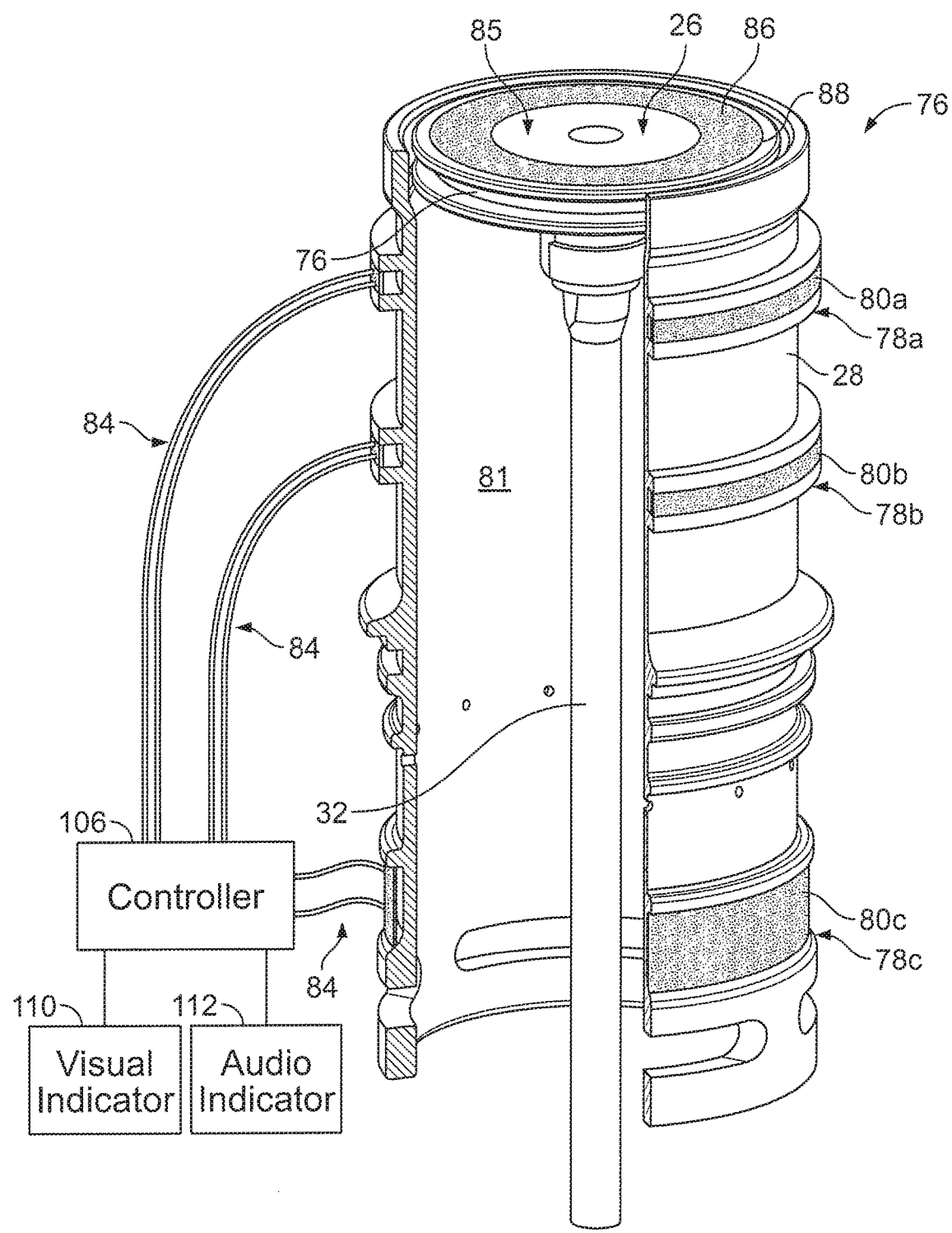
FIG. 2 is a fragmentary side vertical section of the present pneumatic fastening tool of FIG. 1.

Referring now to FIGS. 1 and 2, the present fastening result indicator or stud hit indicator 10 is schematically shown mounted to a fastener driving tool, generally designated 12. More specifically, the tool 12 includes a housing 14 defining a power source enclosure 16, and a nosepiece 18 depending from the enclosure and having a vertically reciprocating workpiece contact element 20. The housing 14 also defines a handle 22 with a trigger 24 and a mount for a magazine 25, constructed and arranged for storing a supply of fasteners (not shown) to be urged toward, and driven from, the nosepiece 18.

Figure 3:
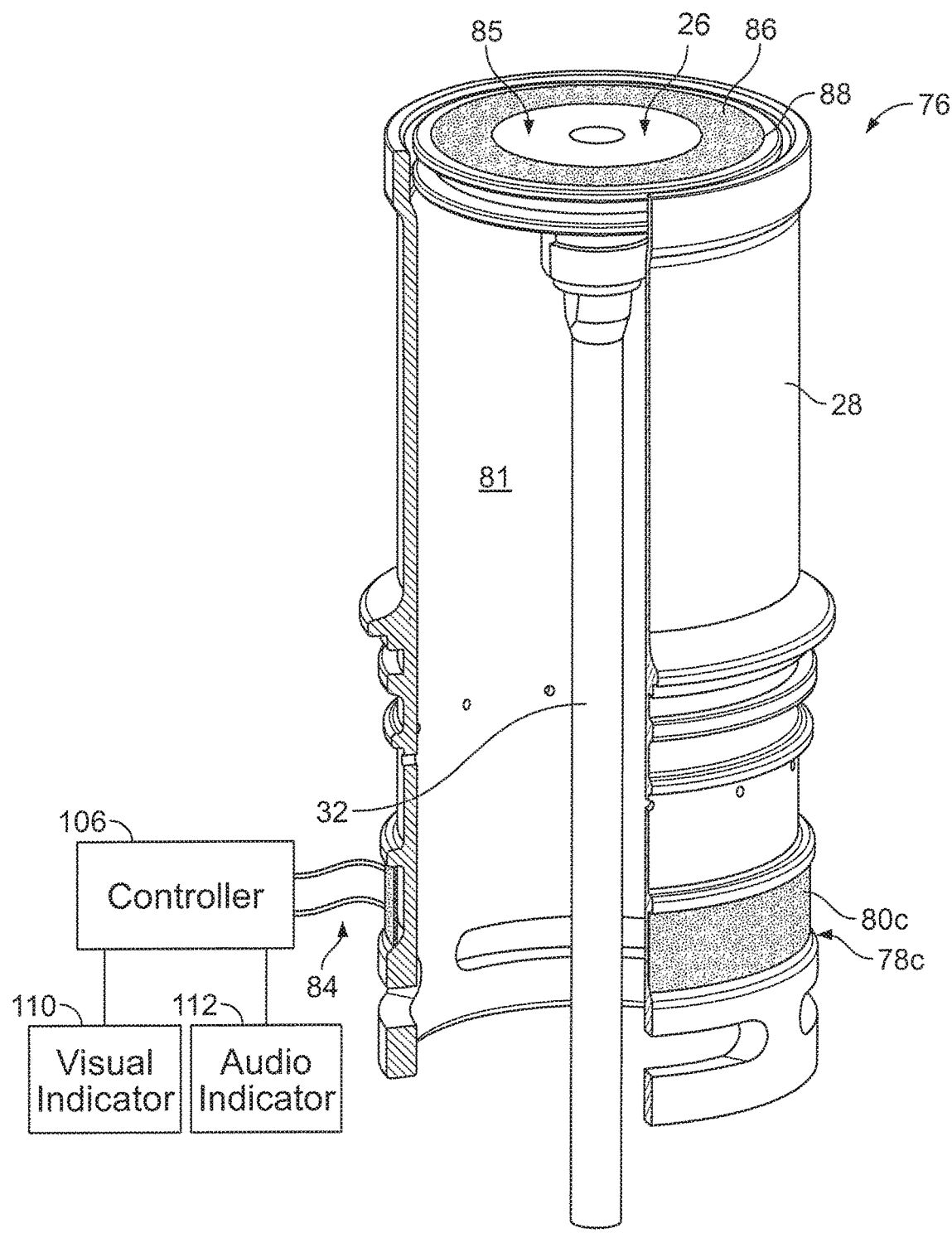
FIG. 3 is a fragmentary perspective view of a piston assembly in the pneumatic fastening tool of FIG. 1 where the piston assembly is connected to a controller and speed and time indicators.

Referring now to FIGS. 3-9, one or more sensors or inductors, such as the coils 80, are associated with or on the cylinder 28. It should be appreciated that the inductors may be on an inner surface or an outer surface of the cylinder 28 or may be attached to any suitable part of the cylinder. In the illustrated embodiment, the coils 80 are wound or wrapped around an outer surface 82 of the cylinder 28 as shown in FIG. 3. Preferably, the coils 80 are wire coils, such as copper coils, or other suitable metal coils. A pair of electrical wires or cables 84 is attached to each of the coils 80 for sending one or more signals from the coils 80 to a controller or processor as will be further described below. The top portion 74 of the piston 26 includes at least one signal generator, such as annular magnet 86, which is seated in a corresponding annular recess 88. It should be appreciated that one or a plurality of magnets 86 may be attached to the top portion 74 of the piston 26 and may have any suitable size or shape.

For example, FIGS. 5 and 6 show different embodiments of the piston 26. Specifically, FIG. 5 shows an embodiment of the piston 26a having a circular top portion 90 and a driver blade 92 extending from the top portion where two circular magnets 94 are inserted in corresponding circular recesses or receptacles 96 defined by a top surface 98 of the top portion 90 of the piston 26a. The magnets 94 may have any suitable size or shape and can be circular, square and the like. Also, FIG. 5 shows a piston having two magnets 94. The piston 26a may have one, two or several magnets 94 attached to the top portion 90 of the piston 26a.

FIG. 6 shows another embodiment of the piston 26b having a driver blade 99 where the magnet 100 is a single annular ring positioned in an annular recess or receptacle 102 and attached to the top portion 103 of the piston 26b. It should be appreciated that the piston 26b may have one or a plurality of annular magnetic rings 100 where the rings are concentric and spaced a predetermined distance from each other.

As the piston 26 moves past the wire coils 80, and more specifically, as the signal generator or magnet on the piston moves through the wire coils, electrical signals are generated by electromagnetic induction. The primary principle behind the generation of the electrical signals in this manner is Faraday's Law. Faraday's Law is a basic law of electromagnetism and states that an induced electromotive force (EMF) in a closed circuit is equal to the time rate of change of the magnetic flux through the circuit. A control board or controller 106 is configured to receive one or more signals generated by the coils 80 and uses the magnitude and/or timing of these signals to control the operation of the tool 12 as described below.

Referring now to FIGS. 3 and 7A-9, the piston assembly 26, and more specifically, inductors 108 on the piston assembly are electrically connected to the controller 106. The controller 106 may include one or more circuit boards, one or more processors or computers or any suitable programmable circuitry. As stated above, when the piston 26 moves downwardly through the cylinder 28 as shown in FIGS. 7A-7D, the movement of the signal generator or magnet 86 on the piston 26 relative to each of the inductors 108 induces an electrical voltage or electrical signal. The magnitude of the signal generated at each of the inductors 108 is proportional to the number of turns of the coils 80 in each of those inductors, the "strength" of the magnet or magnets 86 on the piston 26 and the speed that the magnet 86 passes by each of the coils per Faraday's Law of induction as discussed above. The controller 106 uses the information from the generated signals to control different operating parameters of the tool 12.

In the above embodiment, the signal generator or signal generators include one or more magnets on the piston 26 and the sensor or sensors include one or more inductors on the cylinder 28. It should be appreciated that the piston assembly and cylinder may include one or more signal generators and one or more sensors. It should also be appreciated that the signal generator and sensor may be a light emitter and light sensor or any suitable signal generator and sensor. The sensor may also be a proximity sensor that detects the proximity or location of the piston relative to the sensor.

In an embodiment, the controller 106 determines the relative time between the generated electrical signals and the designated distance between each of the electrical conductors 108 (or coils 80) to compute an average speed of the piston 26. Also the magnitude of the electrical signal is used to compare the speed at which the piston 26 passes a particular coil 80 to other previously observed electrical signals or to one or more reference signals programmed or enter into a particular coil to other previously observed electrical signals or to one or more reference signals programmed or entered into the controller. Thus, the controller is able to use the information determined from the electrical signals to compute the time, position and speed associated with different sections of the cylinder 28 and the piston and driver blade 32 travel for a given nail fastener driving result.

For example, the average initial speed of the piston 26 and driver blade 32 can be determined by the electrical signals generated by the two uppermost coils 80a and 80b. Knowing the speed of the piston 26, the controller 106 predicts the expected timing and/or magnitude of the electrical signal generated by lower coil 80c as the piston 26 continues to travel within the cylinder 28. As a result, predictions or estimates of signal timing and/or signal magnitude at the lowermost coil 80c can be made to determine how much of a tool's available drive energy is remaining at the end of the piston stroke which indicates how much energy was used to drive a particular fastener. The information from the generated electrical signals can also be used for other purposes related to the tools such as maintenance alerts, over pressure/under pressure communication or providing a tool that is "tunable" for particular fastening applications.

Referring now to FIGS. 1 and 3, a visual indicator 110, an audio indicator 112 or a combination of the visual and audio indicators may be electrically connected to the controller 106 to indicate an operating parameter of the tool 10. The visual and audio indicators 110, 112 are also employed to indicate when a fastener has been driven to a predetermined depth or into one or more underlying materials. As shown in FIG. 1, a light source, such as a light emitting diode (LED) 114, is attached to the tool housing 12 and is in electrical communication with the controller 106. The light source 114 is activated or lights up when a particular designated fastening result is achieved by the tool 10. Such indicators provide positive reinforcement to a user that the fastener was successfully driven into an underlying substrate or into a predetermined number of materials. In other embodiment, the audio indicator 112, includes an audio output such as a speaker 115, which is electrically connected to the controller 106 and emits a sound or plurality of sounds when a fastener is driven to the predetermined depth or into a predetermined number of materials.

In an embodiment, a selector, such as a user selectable switch 116, is movably connected to the housing 12 as shown in FIG. 1 and enables a user to move the switch between a first position and a second position. The first and second positions are selectable based on the density of the materials that the fastener is being driven into. A user moves the switch 116 to the first or second position to prompt the controller 106 to expect results in pre-programmed range determined through prior testing or calibration. The switch 116 may be any suitable type of selector, such as a switch, dial or knob.

Figure 7A:
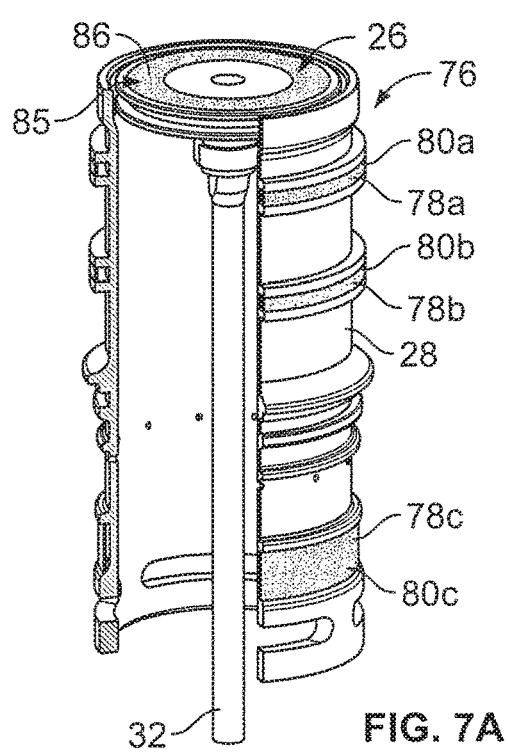
FIG. 7A is a perspective view of the piston in the piston assembly of FIG. 3 where the piston is at a first position within the cylinder.
Figure 7B:
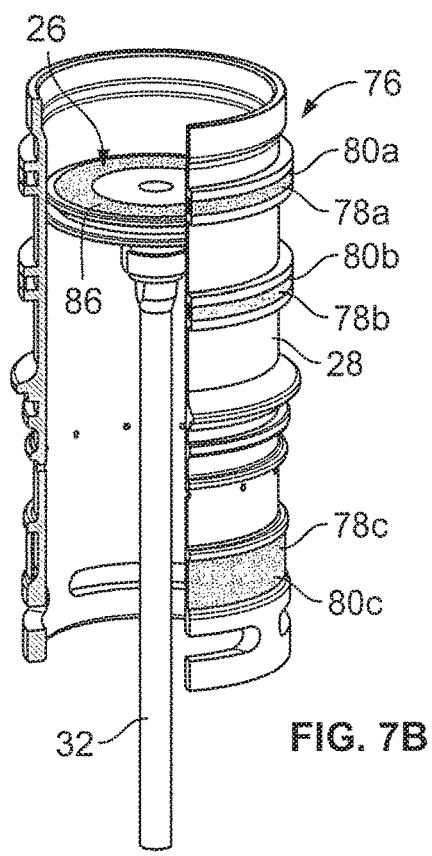
FIG. 7B is a perspective view of the piston in the piston assembly of FIG. 3 where the piston is at a second position within the cylinder.
Figure 7C:
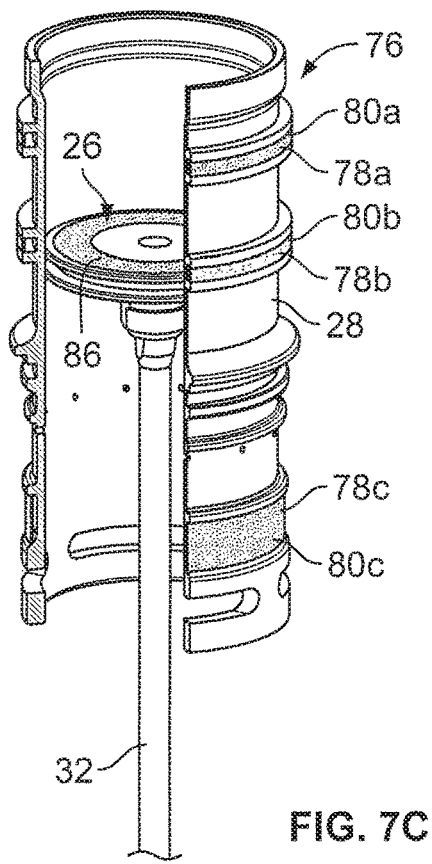
FIG. 7C is a perspective view of the piston in the piston assembly of FIG. 3 where the piston is at a third position within the cylinder.
Figure 7D:
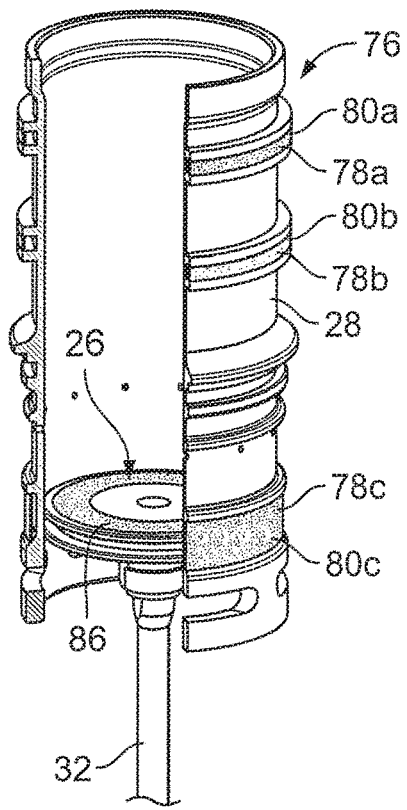
FIG. 7D is a perspective view of the piston in the piston assembly of FIG. 3 where the piston is at a fourth position within the cylinder.
Figure 8:
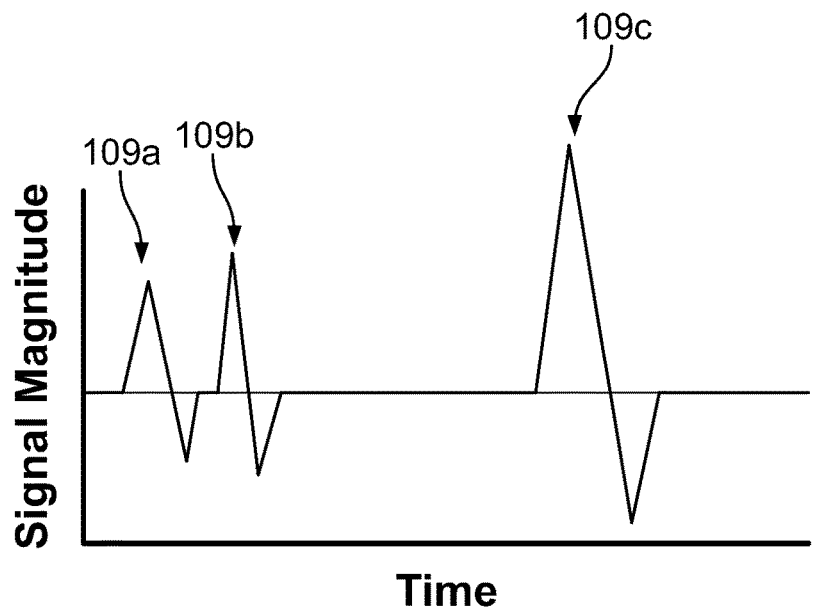
FIG. 8 is a graph showing the magnitude of a signal over time based on different positions of the piston within the cylinder.

Referring now to FIGS. 7A, 7B, 7C and 7D, the piston 26 moves through the cylinder 28 from an initial position at the top of the cylinder shown in FIG. 7A, a position just passed the topmost electrical conductor 108a as shown in FIG. 7B, a position just passed the second electrical conductor 108b as shown in FIG. 7C, and a position adjacent to the lowermost or bottom electrical conductor 108c shown in FIG. 7D. As stated above, as the magnet 86 on the piston 26 reaches and passes each of the electrical conductors 108, an electrical signal 109 is generated as illustrated in the graph shown in FIG. 8. The magnitude of the electrical signal varies based on the number of coils of each electrical conductor 108, the distance between the coils, the strength of the magnetic field and the speed at which the magnet or magnets pass through the coil. In FIG. 8, the electrical signals 109a, 109b for the two upper electrical conductors 108a and 108b are spatially closer together than to the bottommost electrical conductor 108c since the upper electrically conductors are physically positioned closer together on the cylinder 18 and the piston (or driver blade) accelerates at the top of the cylinder. It should be appreciated that the number and positioning of the electrical signals shown in FIG. 8 varies based on one or more of the above factors.

The magnitude and speed at which the electrical signals are generated by the movement of the piston 26 are used to determine when two or more substrates or materials have been fastened together which is desirable, i.e., a "hit," or when a fastener has been driven only into a top layer of a particular material, a top substrate/material of a plurality of substrates/materials or only through a single substrate/material, all of which are undesirable or "misses." This information is particularly important when fastening multiple substrates/materials together such as when a user is installing sheathing, wallboard or roofing shingles.

Figure 9:
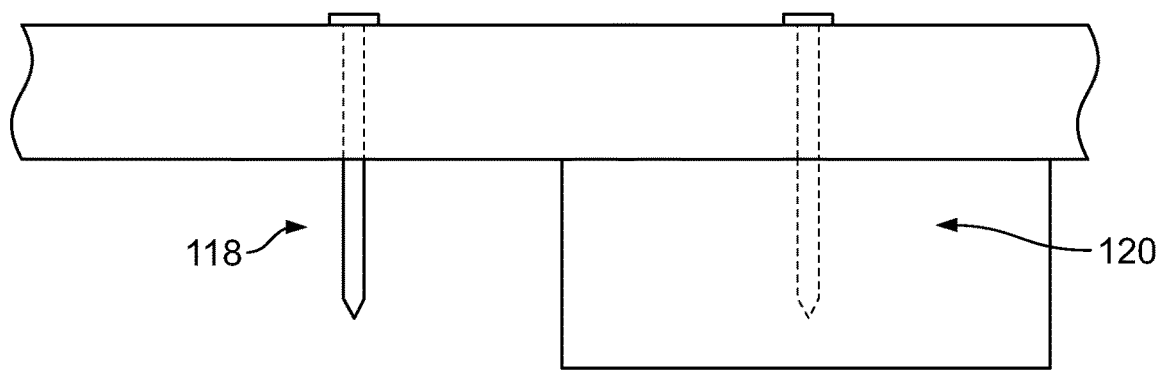
FIG. 9 is a schematic drawing showing fasteners driven into one or more underlying substrates by the pneumatic fastening tool of FIG. 1.

Referring now to FIG. 9, building materials have many different densities and therefore it may be necessary for the controller 106 to be programmed with the signal expectations of the various material densities to be fastened together. Without such pre-programmed information, it can be difficult to differentiate between a desired fastening result into low density materials and an undesirable fastening result in high density sheet products. Thus, as described above, a selector 116 is connected to the tool 10 and allows the user to select between two or more materials densities. The selected position prompts the controller 106 to expect results in a pre-programmed range so that when a fastener is driven, a positive indication is provided to a user via the visual and/or the audio indicator 110, 112 (FIGS. 1 and 3).

In an embodiment, a calibration procedure is performed by the user where the user intentionally drives a fastener into a single substrate, which is a miss result or "miss" (118 in FIG. 9), and a plurality of substrates, which is a hit result or "hit" (120 in FIG. 9), to teach the controller which electrical signal speeds and magnitudes are associated with a given result. Alternatively, a constant automatic calibration sequence is performed by the controller 106 in which the controller monitors and records the electrical signal speeds and/or magnitudes resulting from past fastener driving results. Since desirable and undesirable results produce sufficiently different electrical signal speeds and/or magnitudes within a particular combination of materials, once an example of a desirable and undesirable result has been observed by the controller 106, the controller sets its signal expectations and alerts or indicates the fastening outcome based on the observed real-time behavior or result to the user.

The above embodiments are directed to pneumatic fastening tools such as pneumatic nailers. It should be appreciated that the present piston assembly may be used in combustion fastening tools and other suitable fastening tools.

While a particular embodiment of a pneumatic-powered fastener-driving tool has been described herein, it will be appreciated by those skilled in the art that changes and modifications may be made thereto without departing from the invention in its broader aspects and as set forth in the following claims.

The invention is claimed as follows:

1. A fastener-driving tool comprising:
    a housing;
    a cylinder within the housing;
    a piston slidably disposed within the cylinder;
    a driver blade extending from the piston;
    a signal generator movable with the piston relative to the cylinder;
    a plurality of sensors associated with the cylinder, each sensor configured to generate a signal based on movement of the signal generator relative to the sensor; and
    a controller configured to communicate with the sensors and, responsive to receiving at least one of the signals, determine whether a positive fastening result or a negative fastening result has occurred based on at least one of the signals.

2. The fastener-driving tool of claim 1, wherein the signal generator includes a magnet.

3. The fastener-driving tool of claim 2, wherein the magnet is on the piston.

4. The fastener-driving tool of claim 2, wherein the plurality of sensors include a plurality of inductors.

5. The fastener-driving tool of claim 1, wherein the controller is configured to determine whether the positive fastening result or the negative fastening result has occurred based at least in part on a magnitude of at least one of the signals.

6. The fastener-driving tool of claim 1, wherein the controller is configured to determine whether the positive fastening result or the negative fastening result has occurred by comparing at least one of the signals to a stored reference signal.

7. The fastener-driving tool of claim 1, wherein the controller is configured to determine, based on at least one of the signals, an amount of energy used to drive a fastener and determine, based at least in part on the determined amount of energy, whether the positive fastening result or the negative fastening result has occurred.

8. The fastener-driving tool of claim 1, which includes an indicator operably connected to the controller, the controller configured to activate the indicator responsive to determining the positive fastening result has occurred.

9. The fastener-driving tool of claim 1, wherein the tool is operable in one of a plurality of different operating modes, the controller configured to determine whether the positive fastening result or the negative fastening result has occurred based in part on the tool's operating mode, and which includes an input device communicatively connected to the controller and configured to enable selection of one of the operating modes in which to operate the tool.

10. The fastener-driving tool of claim 1, wherein the positive fastening result corresponds to a fastener being driven into a stud and the negative fastening result corresponds to the fastener not being driven into the stud.

11. A fastener-driving tool comprising:
a housing;
a cylinder within the housing;
a piston slidably disposed within the cylinder;
a driver blade extending from the piston;
a signal generator movable with the piston relative to the cylinder;
a plurality of sensors associated with the cylinder, each sensor configured to generate a signal based on movement of the signal generator relative to the sensor; and
a controller configured to communicate with the sensors and, responsive to receiving at least one of the signals during an actuation of the tool to drive a fastener with the driver blade, determine whether a positive fastening result or a negative fastening result has occurred based on at least one of the signals and stored reference data.

12. The fastener-driving tool of claim 11, wherein the controller is configured to: (1) determine a speed of the piston based on a plurality of the signals; and (2) determine whether the positive fastening result or the negative fastening result has occurred based at least in part on the speed of the piston.

13. The fastener-driving tool of claim 12, wherein the stored reference data includes a designated range of speeds, and the controller is configured to determine: (1) the positive fastening result occurred when the determined speed of the piston is within a designated range of speeds; and (2) the negative fastening result occurred when the determined speed of the piston is not within the designated range of speeds.

14. The fastener-driving tool of claim 11, which includes an indicator operably connected to the controller, the controller configured to activate the indicator responsive to determining the positive fastening result has occurred.

15. The fastener-driving tool of claim 11, wherein the controller is configured to determine, based the signals, an amount of energy used to drive the fastener and determine, based at least in part on the determined amount of energy, whether the positive fastening result or the negative fastening result has occurred.

16. The fastener-driving tool of claim 11, wherein the tool is operable in one of a plurality of different operating modes, the controller configured to determine whether the positive fastening result or the negative fastening result has occurred based on the tool's operating mode, and which includes an input device communicatively connected to the controller and configured to enable selection of one of the operating modes in which to operate the tool.

17. The fastener-driving tool of claim 11, wherein the positive fastening result corresponds to the fastener being driven into a stud and the negative fastening result corresponds to the fastener not being driven into the stud.

18. A fastener-driving tool comprising:
a housing;
a cylinder within the housing;
a piston slidably disposed within the cylinder;
a driver blade extending from the piston;
a signal generator movable with the piston;
a plurality of sensors associated with the cylinder, each sensor configured to generate a signal based on movement of the signal generator relative to the sensor; and
a controller configured to:
communicate with the sensors;
responsive to receiving at least one of the signals, determine whether a positive fastening result or a negative fastening result has occurred based on at least one of the signals;
determine a speed of the piston based on a plurality of the signals; and
determine whether the positive fastening result or the negative fastening result has occurred based at least in part on the speed of the piston.

19. The fastener-driving tool of claim 18, wherein a first sensor is spaced-apart from a second sensor and the controller is configured to determine the speed of the piston based on the signals received from the first and second sensors.

20. The fastener-driving tool of claim 18, wherein the controller is configured to determine: (1) the positive fastening result occurred when the determined speed of the piston is within a designated range of speeds; and (2) the negative fastening result occurred when the determined speed of the piston is not within the designated range of speeds.

* * * * *